United States Patent [19]

Sasaki et al.

[11] 4,226,687

[45] Oct. 7, 1980

[54] METHOD OF PREVENTING FINE CRACKS FROM OCCURING IN RUBBER OR PLASTIC INSULATION OF AN INSULATED WIRE OR CABLE EXPOSED TO ELECTRON BEAM IRRADIATION

[75] Inventors: Takashi Sasaki, Takasaki; Miyuki Hagiwara, Maebashi; Kunio Araki, Mito; Hayao Ishitani, Hiratsuka; Eisuke Saito, Kamakura; Kyozi Komatsu, Yokosuka, all of Japan

[73] Assignees: The Furukawa Electric Co., Ltd.; Japan Atomic Energy Research Institute, both of Tokyo, Japan

[21] Appl. No.: 944,782

[22] Filed: Sep. 22, 1978

[30] Foreign Application Priority Data

Sep. 30, 1977 [JP] Japan ............... 52-117356

[51] Int. Cl.² ............... C08F 2/46; C08F 8/00
[52] U.S. Cl. ............... 204/159.13; 204/159.14 R; 204/159.2; 250/492 B; 427/44
[58] Field of Search ............... 204/159.14, 159.19, 204/159.2, 159.13; 250/492 B; 427/44

[56] References Cited

U.S. PATENT DOCUMENTS

| | | | |
|---|---|---|---|
| 3,330,748 | 7/1967 | Lawton | 250/492 B X |
| 3,683,179 | 8/1972 | Norman | 250/49.5 TE |
| 3,725,230 | 4/1973 | Bahder et al. | 204/159.2 |
| 3,833,814 | 9/1974 | Nablo | 250/492 |
| 3,925,671 | 12/1975 | Austin et al. | 250/400 |
| 3,942,017 | 3/1976 | Vehara et al. | 250/492 B |

Primary Examiner—Richard B. Turer
Attorney, Agent, or Firm—Frishauf, Holtz, Goodman & Woodward

[57] ABSTRACT

A method of manufacturing an electric wire or cable having an improved rubber or plastic insulation layer which has the maximum wall thickness of beam penetration of 4mm or over and whose properties are improved by irradiation with an electron beam, wherein the wire or cable runs under the scanner of an electron beam accelerator while being rotated about the axis of the wire or cable at such a speed as causes the same portion of the wire or cable to be irradiated with the electron beam at least twice during a period of less than 10 seconds; and the electron beam accelerator directs on the insulation layer of the wire or cable an electron beam which is accelerated to an energy of 1 MeV or over and whose maximum penetration range in the said insulation layer is larger than its thickness.

5 Claims, 3 Drawing Figures

METHOD OF PREVENTING FINE CRACKS FROM OCCURING IN RUBBER OR PLASTIC INSULATION OF AN INSULATED WIRE OR CABLE EXPOSED TO ELECTRON BEAM IRRADIATION

DETAILED DESCRIPTION OF THE INVENTION

This invention relates to improvements on a method of manufacturing a rubber or plastic-insulated wire or cable, whose rubber or plastic insulation layer is improved in mechanical and thermal properties by irradiation with an electron beam.

It is already practically applied to irradiate a rubber or plastic insulation layer coated on a wire or cable by ionizing radiation in order to improve the mechanical and thermal properties of the said insulation layer.

For this purpose, an electron beam is generally applied, because of relatively large dose can be provided with relative ease for irradiating the insulation layer of a wire or cable with an ionizing radiation. With, for example, polyethylene-insulated wire or cable, a dose of 1 to 50 Mrad is generally irradiated at the dose rate of about $1 \times 10^6$ rad/sec. Since the wire or cable contains an electric conductor in the center, it is impossible to treat the whole of the insulation layer by irradiating the said insulation layer with an electron beam only from one direction. The customary practice, therefore, is to irradiate first from one peripheral side of the insulation layer of a wire or cable by an electron beam during its running and then expose the opposite side of the wire or cable to an electron beam accelerator by reversing the said wire or cable to be irradiated again with the electron beam.

It has been found, however, that if a rubber or plastic insulation layer coated on a wire or cable has a relatively large thickness, then irradiation with an electron beam gives rise to fine cracks in the insulation layer itself, prominently decreasing the dielectric strength of the wire or cable.

Since the cause leading to such cracks has not yet been distinctly clarified, it has been considered inadvisable to try to improve a large diameter wire or cable or high voltage ones insulated with a thick insulation layer made of rubber or plastic material by irradiation with an electron beam.

The present inventors have noticed that when irradiated with an electron beam, rubber or plastic material displays excellent mechanical and thermal properties. The inventors have contemplated to apply the above-mentioned modification technique based on irradiation with an electron beam in manufacturing a large diameter wire or cable or high voltage ones. For this purpose, they have continued studies on a method of suppressing fine cracks in the insulation layer made of rubber or plastic material when irradiated with an electron beam. As the result, it has been found that a wire or cable covered with a rubber or plastic insulation layer having a maximum wall thickness of beam penetration of 4 mm or over can be improved in mechanical and thermal properties without causing the aforesaid difficulties by applying the undermentioned process. The process is to run a rubber or plastic-insulated wire or cable under the scanner of an electron beam accelerator while being rotated at such a speed as allows the same portion of the insulation layer to be irradiated with the electron beam at least twice during a period of less than 10 seconds; and also to deliver on the rubber or plastic insulation layer the electron beam which is accelerated to an energy of 1 Mev or over and whose maximum penetration range in the insulation layer of a wire or cable being irradiated is chosen to be larger than the thickness of the said insulation layer.

The mechanism has not yet been clarified by which the occurrence of fine cracks is suppressed in the rubber or plastic insulation layer of a wire or cable if the same portion of the said insulation layer is irradiated with an electron beam at least twice during a period of less than 10 seconds while the wire or cable is rotated while running. However, the suppression of fine cracks is supposed to result from the complicated effect of electric charges generated in the insulation layer and diffused therethrough. It is supposed that the generation and/or diffusion of the electric charges under such an irradiation condition exerts a certain advantageous effect on the insulation layer while it is irradiated with an electron beam, and this effect is sustained even after irradiation with the electron beam is brought to an end, thereby restricting the appearance of fine cracks in the insulation layer as much as during the said irradiation. Therefore, the shorter the period during which the same portion of the insulation layer is irradiated at least twice with an electron beam, the more prominent the aforesaid effect on the suppression of fine cracks in the insulation layer.

The present inventors' studies show that if the same portion of the insulation layer is irradiated with an electron beam at least twice during a period of less than 10 seconds, then the above-mentioned fine cracks are effectively suppressed, but that if the period is out of the said range, the above-mentioned effect is not displayed.

It will now be described with reference to the accompanying drawing the reason why, in the method of this invention, a wire or cable is rotated at such a speed as to cause the same section of the rubber or plastic insulation layer thereof to be irradiated with an electron beam at least twice during a period of less than 10 seconds and the concrete method of ensuring the said rotation.

DETAILED DESCRIPTION

Figure 1:
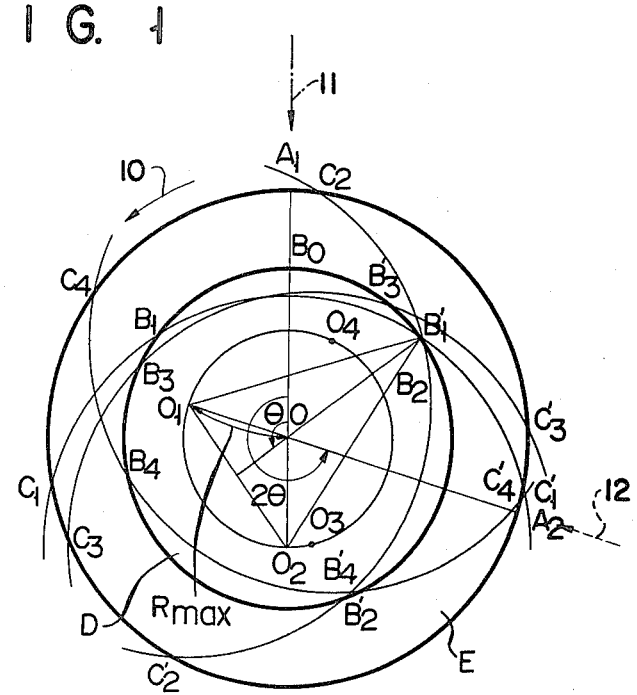
FIG. 1 is an explanatory cross sectional view of a rubber or plastic-insulated wire or cable, showing the manner in which an electron beam irradiation is conducted to the insulation layer while the said wire or cable is rotated about the axis.

In FIG. 1, $2r_1$ is the outer diameter of a wire or cable whose conductor D has a diameter $2r_2$, and the wire or cable which is coated with rubber or plastic insulation layer E is irradiated with an electron beam whose maximum penetration range in the insulation layer E is $R_{max}$, while being rotated to the right under the scanner of an electron beam accelerator. Then those portions of the wire or cable which are irradiated with the electron beam are progressively shifted. This means that if the wire or cable is supposed to be fixed instead of being rotated, the direction from which the electron beam is delivered is successively moved to the left as indicated by the solid line arrow 10 in FIG. 1. If the electron beam irradiation is first performed from the direction of $A_1O$ as indicated by the dot-dash-line arrow 11 (O denotes the center of the wire or cable), then the electron beam penetrates up to the range defined by arcs $C_1 B_1$, $B_1 B_0 B_1'$, and $B_1'$ and $C_1'$. The arc $C_1 B_1 B_1' C_1'$ has the radius of $r_1$ and the center $O_2$ whose position is on the extension of a line $A_1O$ and $O\ O_2 = R_{max}$. Then that region of the insulation layer which is defined with the points $A_1$, $C_1$, $B_1'$ and $C_1'$ is irradiated with the electron beam. When the point $C_1'$ is removed from the irradiated region due to the rotation of the direction of irradiation to the left, then the electron beam is delivered to a zone having, for example, an arc $C_3 B_3 B_3' C_3'$ defined with the radius $r_1$ about a point $O_3$ lying on a circumference drawn about the point O, with the radius $O\ O_2$, namely, $R_{max}$. As the result, the point $B_1'$ together with the point $C_1'$ is removed from the first irradiation region. When the point $C_1'$ begins to be again irradiated due to the further rotation to the left, the electron beam penetrates up to the arc $C_4 B_4 B_4' C_4' (C_1')$ defined by the radius $r_1$ about a point $O_4$ lying on a circumference drawn about the point O with a radius of $O\ O_2$. Therefore, the point $C_1'$ comes into the irradiated area again earlier than the point $B_1'$. The point $B_1'$ is removed out of the irradiated region earliest among the region defined with the points $A_1$, $C_1$, $B_1$, $B_1'$ and $C_1'$ and is again irradiated with the electron beam latest among the above-mentioned region, the direction of irradiation being $A_2O$ as indicated by the dash line arrow 12. Now if the angle of the rotation from $A_1O$ to $A_2O$ is $2\theta$ (radian), $>O_2OB_2 = \theta$. Since, $O_2B_2 = r_1$, $OB_2 = r_2$, $O\ O_2 = R_{max}$, the following equation results:

$$O_2B_2^2 = OB_2^2 + OO_2^2 - 2OB_2 \cdot OO_2 \cdot \cos\theta$$

and $$\cos\theta = \frac{R_{max}^2 - (r_1^2 - r_2^2)}{2r_2 \cdot R_{max}} \text{ (in case of } R_{max}^2 \leq r_1^2 - r_2^2)$$

In the case of $R_{max}^2 > r_1^2 - r_2^2$, the electron beam is shut off by the conductor of wire of cable. Since the backside of the conductor is never irradiated by the electron beam, the rotation angle $2\theta$ should always be $\pi$. In this case, therefore, $\cos\theta = 0$. Since a rotation of $2\theta$ within 10 seconds is necessary, the speed of rotation should be $6\ \theta/\pi$ (r.p.m.) or over. Namely, the wire or cable should be rotated about the axis at a speed of $6\ \theta/\pi$ (r.p.m.) or over. Actually when a rubber or plastic-insulated wire or cable was rotated about the axis at a speed of $6\ \theta/\pi$ (r.p.m.) or over, the occurrence of fine cracks was suppressed, thereby attaining the object of this invention.

where: $\theta = \cos^{-1}\left[\frac{R_{max}^2 - (r_1^2 - r_2^2)}{2r_2 \cdot R_{max}}\right]$ (in case of $R_{max}^2 \leq r_1^2 - r_2^2$)
$\theta = \pi/2$ (in case of $R_{max}^2 > r_1^2 - r_2^2$)

When the rotation speed is represented by N (r.p.m.) and the width of the irradiation area of the electron beam in the running direction of a wire or cable is denoted by L (m), the wire or cable should run at a speed of N·L (m/min) or less. If the running speed exceeds N·L, then the initially irradiated region of the insulation layer of the wire or cable will be carried beyond the irradiation area of the electron beam before the said irradiated region is again irradiated with the electron beam due to the rotation of the wire or cable, causing some part of the insulation layer not to be irradiated twice and resulting in a failure to suppress the occurrence of fine cracks.

Further, from the object of ensuring the uniform distribution of the electron beam in the insulation layer of a wire or cable, it is preferred that where a wire or cable runs, the same part of the insulation layer of the said wire or cable should be irradiated more than three times with the electron beam. Namely, the running speed is desired to be less than (N·L)/3 (m/min). If the running speed is not less than (N·L)/3, then the absorption of the electron beam is not uniform in the insulation layer, causing lack of uniformity of crosslinking.

The practically most preferred process of causing a rubber or plastic-insulated wire or cable to run at a prescribed speed while being rotated at a specified rate is to rotate a wire or cable supply and takeup devices in the same direction and at the same speed. The reason why, in the method of this invention, an electron beam to be used is chosen to have a maximum penetration range larger than the thickness of a rubber or plastic insulation layer, is that if the maximum range is shorter than the thickness of the insulation layer, the ionization in the insulation layer by the electron beam becomes discontinuous, tending to give rise to fine cracks in such region, no matter how quickly the wire or cable is rotated about the axis. As used herein, the term "the maximum penetration range of electron beam" is defined as a maximum distance up to which the electron beam penetrates a substrate. An electron beam accelerated to an energy of 1 MeV, 2 MeV, 3 MeV has a maximum range of about 4 mm, 11 mm, 17 mm, respectively, with respect to rubber or plastic material having a specific gravity of 1. The reason why, in the method of this invention, an electron beam should be accelerated to an energy of 1 MeV or over, is that a lower accelerating energy than 1 MeV fails to cause a uniform distribution of the electron beam in a rubber or plastic insulation of which the maximum wall thickness for beam penetration is 4 mm or over, and to prominently improve the properties thereof as primarily intended by this invention.

For the object of this invention, a dose rate of the electron beam generally falls within the range of $10^2$ to $10^9$ rad/sec. For industrial purposes, however, the dose rate is preferred to be in a range between $10^4$ and $10^7$ rad/sec. As used herein, the term "rubber or plastic-insulated wire or cable" is defined to mean a wire or cable manufactured by coating a metal conductor such as copper or aluminium alloy with an insulation layer of which the maximum wall thickness for beam penetration is 4 mm or over and is made of rubber material such as natural rubber, ethylene-propylene rubber, polydiene rubber, polysiloxane rubber, ethylene-vinyl acetate rubber, chlorosulfonated polyethylene rubber, and chlorinated polyethylene rubber or plastic material such as polyethylene, polyvinyl chloride, polypropylene, polyvinylidene fluoride, and ethylene-tetrafluoroethylene copolymer. If the insulation layer has a maximum wall thickness smaller than 4 mm, fine cracks are little likely to occur in the said layer, without substantially practical difficulties. When, the irradiation of the insulation layer is carried out at a high ambient temperature, then the irradiated insulation layer will tend to suffer from foaming or deformation. It is therefore preferred to carry out the said irradiation at a temperature of 60° C. or lower in the method of this invention.

This invention will be more fully understood with reference to the examples which follow.

EXAMPLE 1

Figure 2:
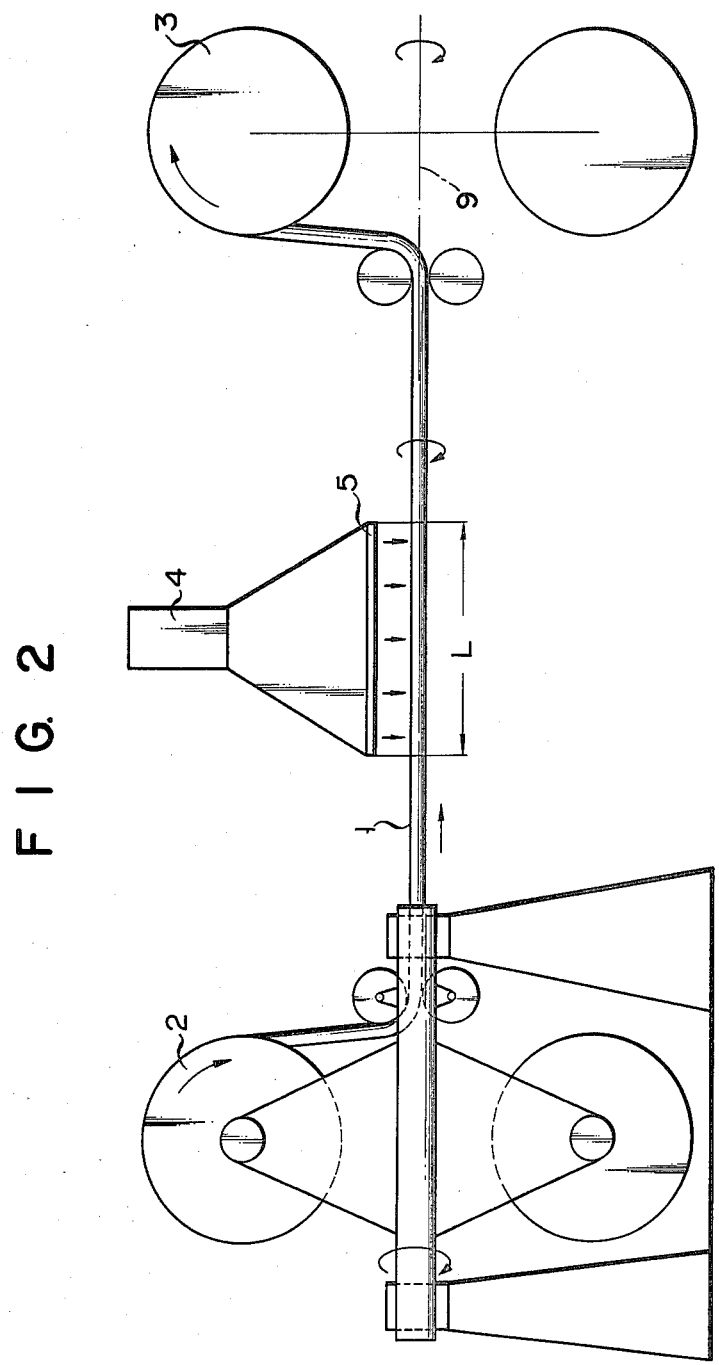
FIG. 2 is a schematic illustration for explaining the steps for manufacturing a rubber or plastic-insulated wire or cable according to the method of this invention.

A cable supply device 2, and a cable takeup device 3 were arranged as shown in FIG. 2 to handle a polyethylene-insulated cable 1 of 24 mm in outer diameter manufactured by extruding a low density polyethylene containing an antioxidant to a thickness of 6 mm on a stranded conductor of 12 mm in diameter. The cable 1 was let to run in the scanning direction under the scanner 5 of a Cockcroft Walton type electron beam accelerator 4. During the irradiation the cable was rotated about the axis 9 within the irradiation area of electron beam, with the cable supply device 2 and cable takeup device 3 rotated in the same direction and at the same speed. The electron beam was accelerated to an energy of 2 MeV and delivered at a dose rate of $6 \times 10^5$ rad/sec. The cable was rotated at a rate of 30 r.p.m. and longitudinally run at a speed of 0.6 m/min. The electron beam from the above-mentioned accelerator had a scanning width, L, of 60 cm, and was delivered into the cable insulation up to a surface dose of 20 Mrad. The polyethylene insulation layer of the cable irradiated by the above-mentioned manner was tested regarding gel fraction, heat deformation, dielectric breakdown voltage and the occurrence of cracks, the results being shown in Table 1 below.

CONTROL 1

Figure 3:
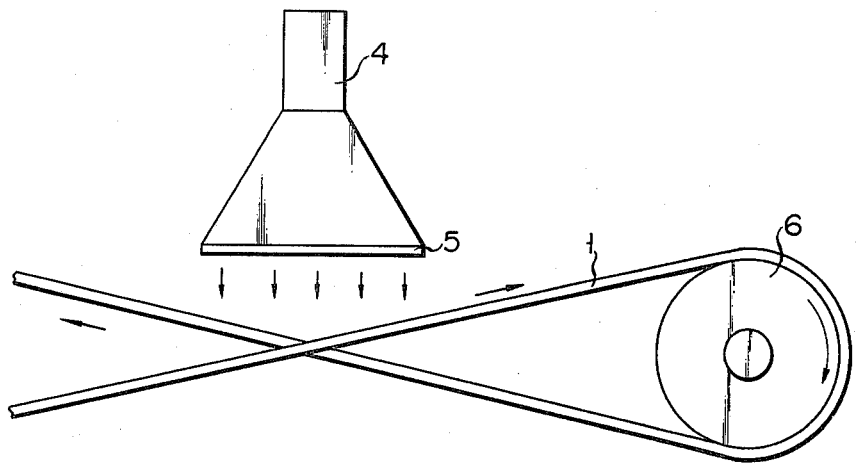
FIG. 3 is a schematic illustration for explaining the steps for manufacturing a rubber or plastic-insulated wire or cable according to the prior art.

A polyethylene-insulated cable 1 constructed in the same manner as in Example 1 was run under the scanner 5 of the same electron beam accelerator 4 as used in Example 1 at a speed of 1.2 m/min in the figure-eight technique as illustrated in FIG. 3. A electron beam of 2 MeV was delivered at a dose rate of $6 \times 10^5$ rad/sec with a scanning width of 60 cm. The cable was reversed by a turn sheave 6 in order to be irradiated from the opposite side. In this case, a dose of electron beam absorbed in the insulation layer averaged 20 Mrad. The properties of the cable irradiated in the above-mentioned manner are also presented in Table 1.

TABLE 1

| Item | Example 1 | Control 1 |
| --- | --- | --- |
| Gel fraction (%) *1 | 71–75 | 58–79 |
| Heat deformation (%) *2 | 22 | 25 |
| Dielectric breakdown voltage (KV) *3 | 122 | 10 |

TABLE 1-continued

| Item | Example 1 | Control 1 |
| --- | --- | --- |
| Occurrence of cracks *4 | No | Yes |

Note:
*1 Samples were taken from five different portions of the irradiated insulation layer of the cable. Indicated numerals denote percent insoluble residue of the insulation after extracted with boiling xylene for 100 hours.
*2 Measured at a temperature of 120° C. with a load of 3 Kg.
*3 Measured by applying alternative current of 50 Hz.
*4 A thin strip was inspected microscopically.

In Example 1, the electron beam was delivered in the insulation layer of a cable running while being rotated. Therefore, the same portion of the insulation layer was always irradiated at least twice during a period of less than 10 seconds. Fine cracks were not observed at all in the insulation layer, which therefore resulted in extremely high dielectric breakdown voltage. In Control 1, however, the cable was irradiated twice from the opposite directions and fine cracks were observed. Further, samples taken from five different portions of the irradiated insulation layer of the cable used in Control 1 had a wide range of gel fraction, proving that the cable of Control 1 was unadaptable practically.

EXAMPLES 2 to 4, and CONTROLS 2 to 4

A cable of 12.4 mm in outer diameter was manufactured by extruding an ethylene-propylene copolymer blended with calcium carbonate and stabilizer to a thickness of 4 mm on a stranded conductor 4.4 mm in diameter. Using the apparatus of FIG. 2, and electron beam of 1.2 MeV was delivered into to the above-mentioned insulation layer with a scanning width, L, of 1.5 m. During the irradiation the cable was run under the electron beam accelerator 4, in the same manner as in Example 1, while being rotated about the axis 9. In this case, the rotation speed (N), running speed of the cable, the dose rate, and the dose irradiated on the surface of the insulation layer were varied as given in Table 2 below.

The heat deformation, dielectric breakdown voltage of the insulation layer and the occurrence of cracks therein, are shown in Table 2 below.

TABLE 2

|  | Example | | | Control | | |
| --- | --- | --- | --- | --- | --- | --- |
|  | 2 | 3 | 4 | 2 | 3 | 4 |
| Rotation speed N (r.p.m.) | 6 | 6 | 30 | 3 | 3 | 10 |
| Running speed (m/min) | 3 | 7.5 | 7.5 | 3 | 0.75 | 18 |
| Dose rate (rad/sec) | $1.6 \times 10^6$ | $4 \times 10^6$ | $4 \times 10^6$ | $1.6 \times 10^6$ | $4 \times 10^5$ | $10^7$ |
| Dose at the surface of the insulation layer (Mrad) | 30 | 30 | 30 | 30 | 30 | 30 |
| Heat deformation (%) *1 | 19 | 25 | 17 | 24 | 17 | 42 |
| Dielectric breakdown voltage (KV) *2 | 86 | 69 | 75 | 10 | 10 | — |
| Occurrence of cracks *3 | No | No | No | Yes | Yes | — |

Notes:
*1 Measured at a temperature of 120° C. with a load of 3 Kg.
*2 Measured by applying alternative current of 50 Hz.
*3 Same as in Table 1

The cable used was 12.4 mm in outer diameter $2r_1$ and 4.4 mm in conductor diameter $2r_2$. An electron beam had a maximum penetration range $R_{max}$ of 5 mm. Therefore, the rotation angle $\theta$ was 0.63 $\pi$ radian, and the rotation speed ensuring the elimination of fine cracks was set at a level of $6\theta/\pi = 3.8$ (r.p.m.) or over, namely, 4 r.p.m. or over; furthermore the running speed of the cable should be N·L (m/min) or less. The insulated cables produced in Examples 2 to 4 all met the above-mentioned requirements and proved to be extremely excellent. The cables of Examples 2 and 3 were rotated at the same speed. Yet, the cable of Example 2 was run more slowly than that of Example 3, namely, at a lower speed than N·L/3 (m/min). Therefore, the cable of Example 2 was more uniformly irradiated with an electron beam and was less subject to heat deformation.

The cable of Control 2 was rotated at a lower speed than 4 r.p.m., giving rise to fine cracks in the insulation layer. The cable of Control 3 was rotated at the same speed as that of Control 2, and longitudinally run at a lower speed, and was irradiated with the electron beam at a smaller dose rate. The insulation layer of the cable of Control 3 was less subject to heat deformation, but had fine cracks because the cable of Control 3 was rotated at a lower speed than 4 r.p.m. The cable of Control 4 was rotated at a higher speed, but was run at a higher speed than N·L. Therefore, the insulation layer of the cable of Control 4 was not uniformly irradiated and had an increased heat deformation, thus rendering the said cable unuseful practically.

What we claim is:

1. A method of preventing fine cracks from occurring in the insulation of an elongated insulated wire or cable having a rubber or plastic insulation layer which has a maximum wall thickness of electron beam penetration of 4 mm or over and whose properties are improved by irradiation with an electron beam, the method comprising:

longitudinally running the wire or cable under a scanner of an electron beam accelerator while rotating said wire or cable about the longitudinal axis thereof at such a speed as causes the same portion of the wire or cable to be irradiated with the electron beam of the electron beam accelerator at least twice during a period of less than 10 seconds; and causing the electron beam accelerator to deliver on the insulation layer of the wire or cable an electron beam which is accelerated to an energy of 1 MeV or over and whose maximum penetration range in the said insulation layer is larger than its thickness.

2. The method according to claim 1, wherein the insulated wire or cable being irradiated with the electron beam is rotated about the axis at a rate of 6 $\theta/\pi$ r.p.m. or over where:

$$\theta = \cos^{-1}\left[\frac{R_{max}^2 - (r_1^2 - r_2^2)}{2r_2 \cdot R_{max}}\right] \text{ (in case of } R_{max}^2 \leq r_1^2 - r_2^2\text{)}$$
$$\theta = \pi/2 \text{ (in case of } R_{max}^2 > r_1^2 - r_2^2\text{)}$$

$R_{max}$ = maximum penetration range of electron beam
$2r_1$ = outer diameter of wire or cable being irradiated with electron beam
$2r_2$ = conductor diameter of wire or cable being irradiated with electron beam.

3. The method according to claim 1, wherein the insulated wire or cable is supplied by a supply device and is taken up, after being irradiated, by a takeup device, the insulated wire or cable being rotated by rotating said supply and takeup devices.

4. The method according to claim 1, wherein the insulation layer of the insulated wire or cable is made of a rubber selected from the group consisting of natural rubber, ethylene-propylene rubber, polydiene rubber, polysiloxane rubber, ethylene-vinyl acetate rubber, chloro-sulfonated polyethylene rubber and chlorinated polyethylene rubber.

5. The method according to claim 1, wherein the insulated layer of the insulation wire or cable is made of a plastic material selected from the group consisting of polyethylene, polyvinyl chloride, polypropylene, polyvinylidene fluoride and ethylene-tetrafluoroethylene copolymer.

* * * * *